Dec. 6, 1927. 1,652,092
E. E. CLEMENT
POLYPHASE BROADCAST DISTRIBUTION
Filed Nov. 27, 1926  6 Sheets-Sheet 1
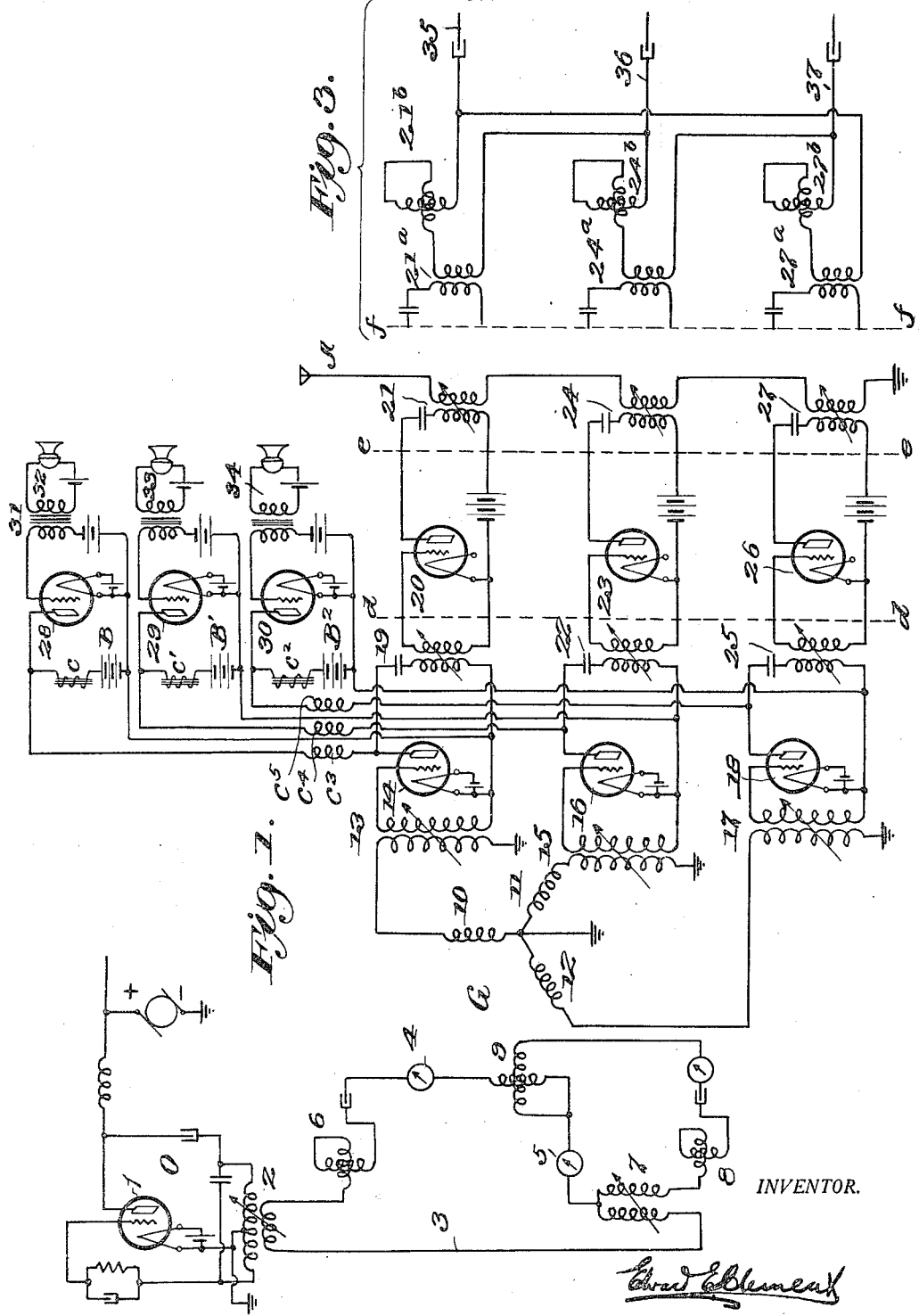
INVENTOR.
Edward E. Clement Dec. 6, 1927.

E. E. CLEMENT 1,652,092

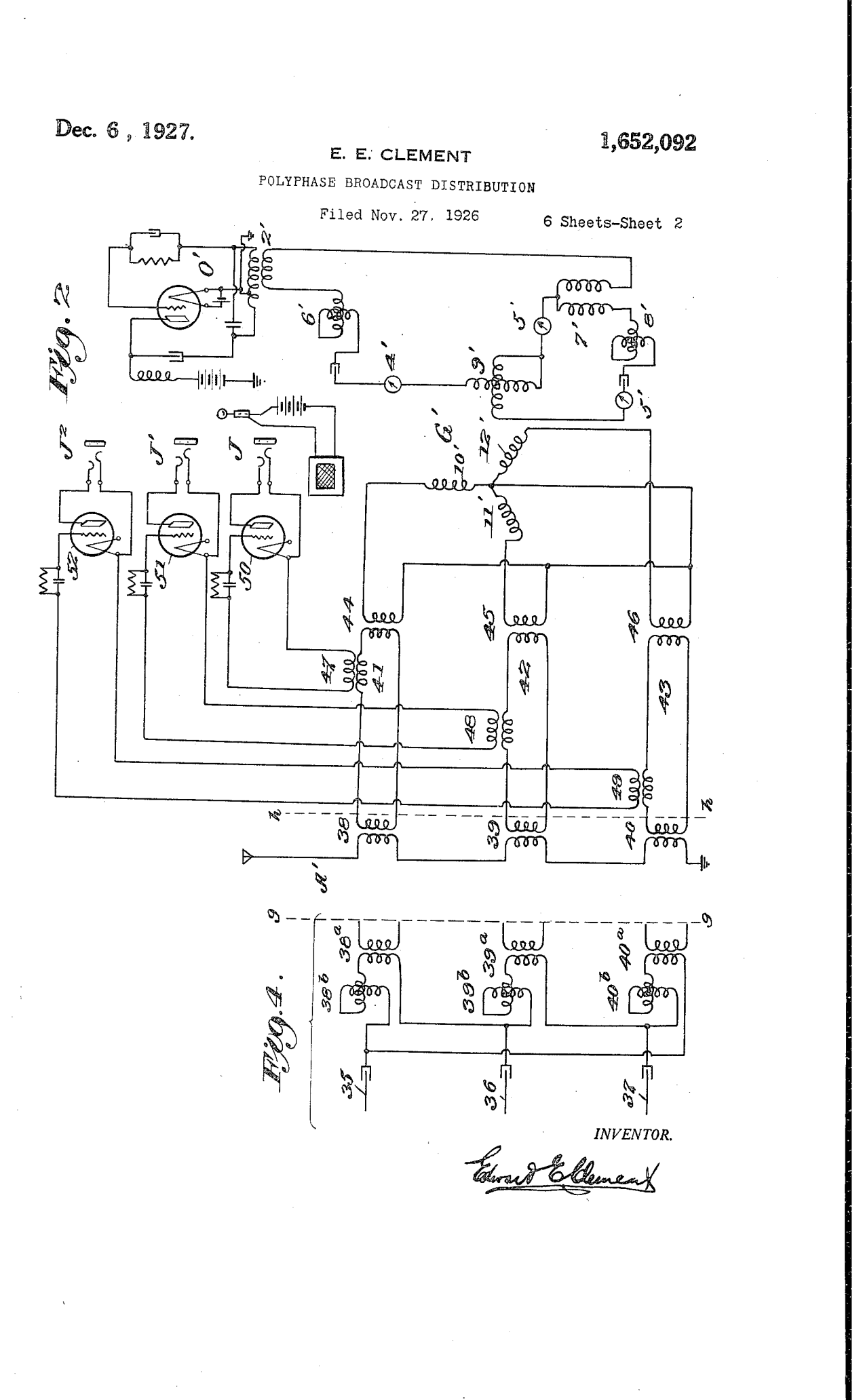

POLYPHASE BROADCAST DISTRIBUTION

Filed Nov. 27, 1926    6 Sheets-Sheet 2

INVENTOR.

Edward E. Clement

Dec. 6, 1927.
E. E. CLEMENT
1,652,092
POLYPHASE BROADCAST DISTRIBUTION
Filed Nov. 27, 1926     6 Sheets-Sheet 3
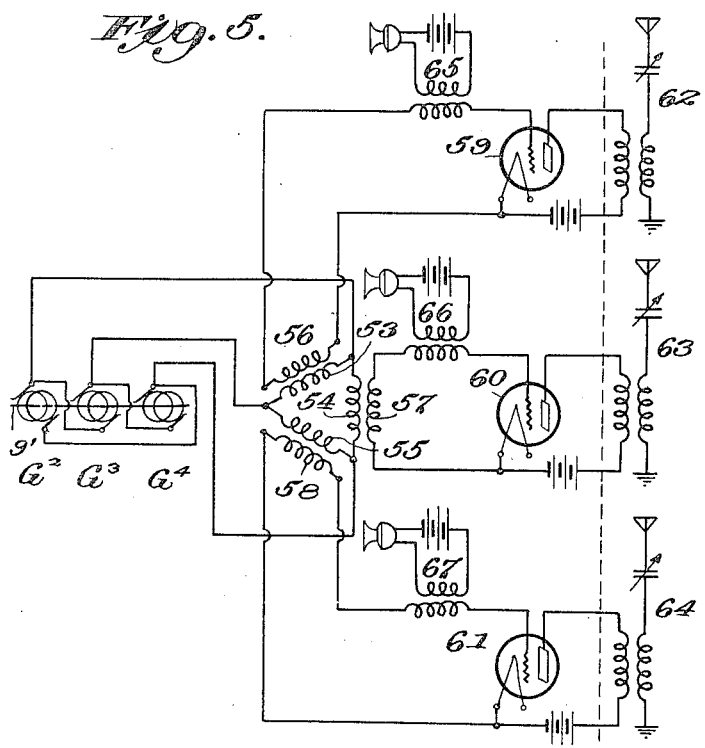
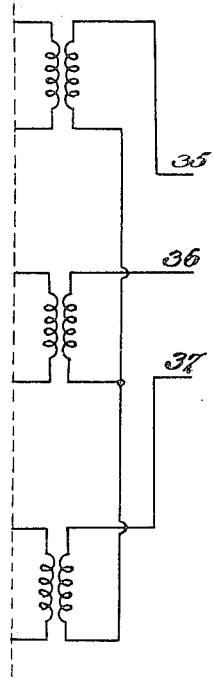
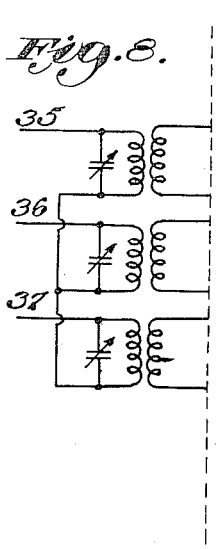
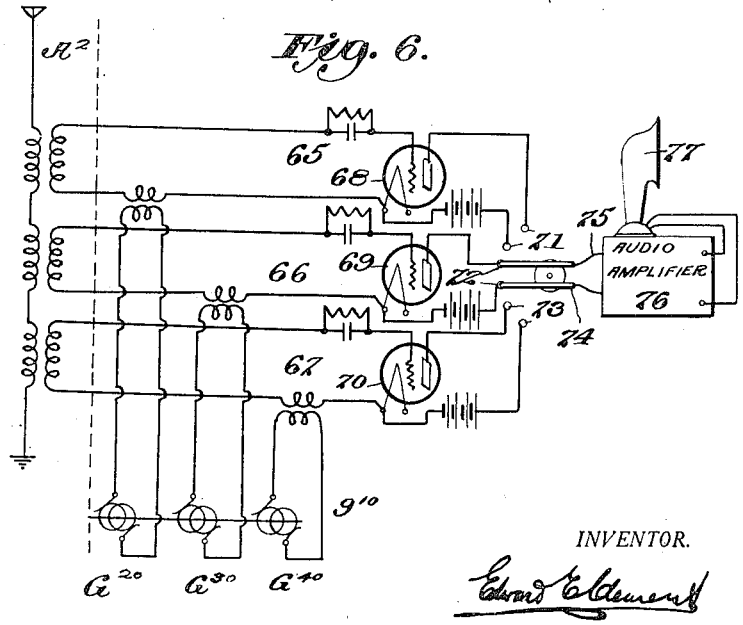
INVENTOR.

Dec. 6, 1927.
E. E. CLEMENT
1,652,092
POLYPHASE BROADCAST DISTRIBUTION
Filed Nov. 27, 1926
6 Sheets-Sheet 4
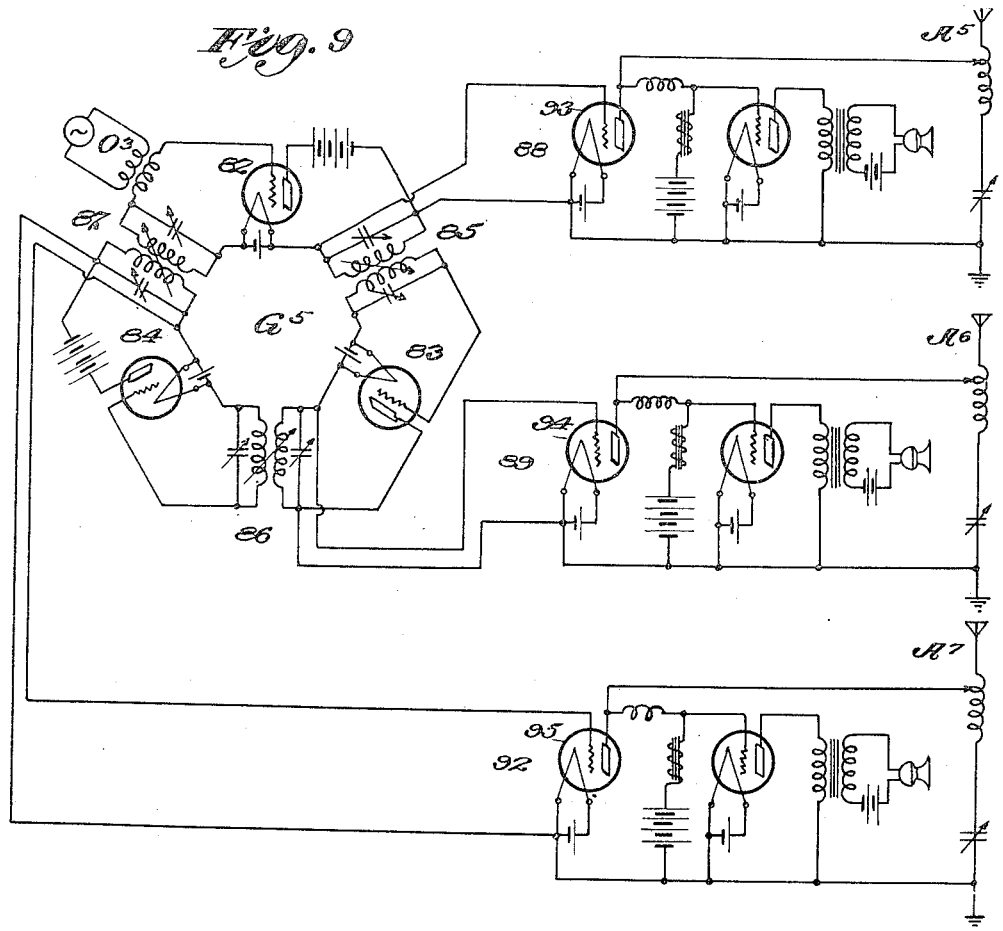
*INVENTOR.*

Dec. 6, 1927.
E. E. CLEMENT
1,652,092
POLYPHASE BROADCAST DISTRIBUTION
Filed Nov. 27, 1926    6 Sheets-Sheet 6
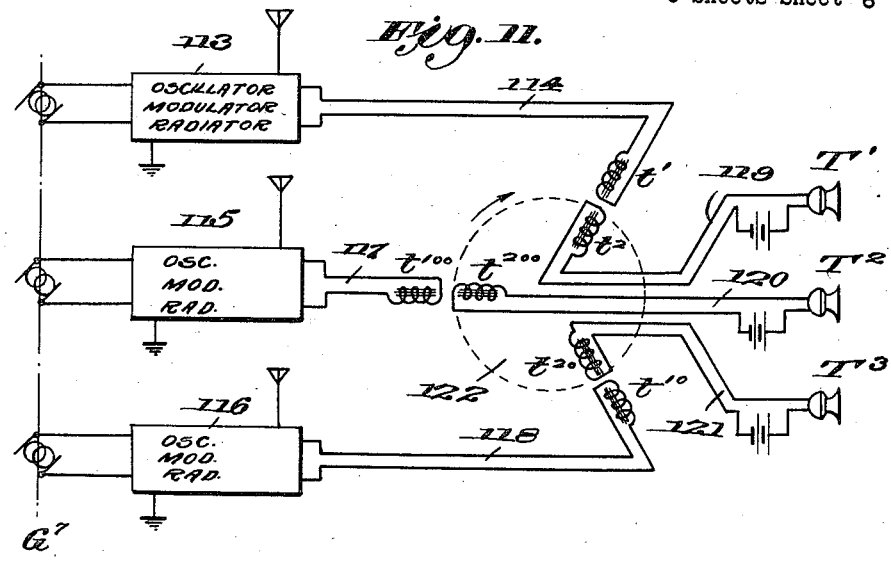
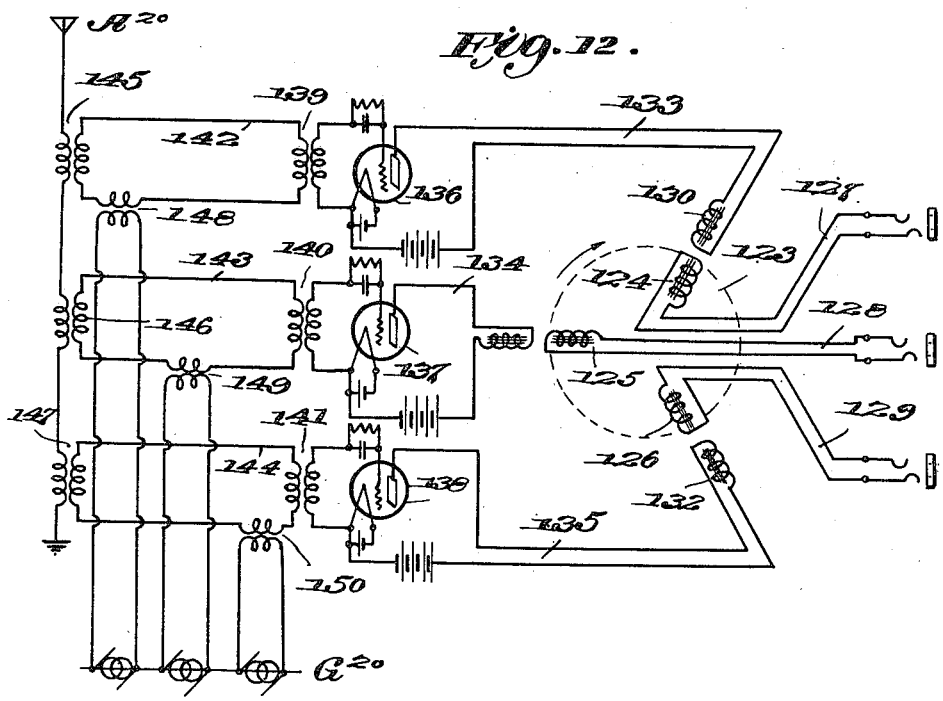
INVENTOR.
Edward E. Clement Patented Dec. 6, 1927.

1,652,092

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

POLYPHASE BROADCAST DISTRIBUTION.

Application filed November 27, 1926. Serial No. 151,117.

My invention relates to the transmission of intelligence, including certain aspects of electrical transmission of energy both through or over wires, and by means of high frequency wave radiation. The object of the invention is to produce what I have chosen to call a mode of "silent wave" transmission, which, while useful in any transmission system, will find a particularly important use in the system which I have chosen to call the "radiowire" system of broadcast distribution, described and claimed among others in my prior co-pending application, Serial No. 746,357, filed October 28, 1924, Patent No. 1,635,153, issued July 5, 1927.

The present invention is in the nature of an improvement over those disclosed in the following applications: Serial No. 31,928, filed May 21, 1925; Serial No. 63,977, filed October 21, 1925, Patent 1,635,156, July 5, 1927; Serial No. 65,860, filed October 30, 1925; Serial No. 65,861, filed October 30, 1925, and is closely related to that disclosed and claimed in my prior application, Serial No. 127,898, filed August 7, 1926.

In order to attain my object, I resort to polyphase wave transmission, both over wires and by radiation. In my prior co-pending application, Serial No. 63,977, (Patent 1,635,156), above mentioned, I have disclosed a scheme of double modulation wherein a primary carrier wave has modulated upon it two different secondary or intermediate frequency carrier waves, and these two IF waves carry, respectively, audio modulations which are rendered audible in an authorized receiver by phase adjustment, but which neutralize each other in any other receiver. In the other two applications mentioned, Nos. 31,928 and 65,861, other methods of transmission, involving phase displacement and phase adjustment, are described.

In the present case I go farther than in any of the other applications, and use the polyphase transmission not only in order to secure secrecy, but also to enable selection of program to be made without multiplying frequencies.

Broadly stated, an important part of the present invention relates to the transmission, reception, and selection of programs, by means of fixed and determinate phase differences in carrier currents of the same frequency. In its simplest form, this system involves the generation, for example, of three phases of the same frequency, 120° apart, a separate modulation of each phase, and their transmission over three wires of a three-phase transmission system, in the same manner that three-phase power currents are transmitted. The unmodulated carrier current being eliminated or suppressed, only side bands are transmitted, composed of the carrier frequency plus or minus the frequencies modulated upon it. An unauthorized person seeking to receive signals of this kind would have to either bridge two of the three conductors, or make a star or delta connection with all three. In either case, the result would amount to nothing or a very faint jumble. On the other hand, by homodyne receiving, with a three-phase receiver in which the receiving oscillator feeds three different phases of the same frequency in synchronism with the three phases of the transmitter, the three carrier currents with their modulations may be re-composed in their respective circuits and taken off either separately or together, according to the nature of their modulations. In another form the invention contemplates polyphase transmission by radiation, radiating three phases of the same frequency, separately modulated, whereby the unmodulated carrier current waves will cancel out, three side bands will be transmitted, and the homodyne receiver, having its oscillator exactly synchronized with that of the transmitting station, will enable the three side bands or three separate phases to be separately received, by analysis, and separately detected to give up their modulations. This form is a modification of that disclosed in my prior application hereinbefore referred to, preferably using double modulation, but with either double or single modulation, employing dephased audio waves for the purpose of neutralizing and cancelling out the signals in an unauthorized receiver, while enabling them to be received, selected, and detected, in an authorized receiver for analyzing. It is to be understood that both single and double modulation are contemplated in so far as each of them is applicable in each one of the several aspects of this invention. I do not, however, broadly claim the application of polyphase high frequency currents to polyphase low frequency power transmission circuits, and I acknowledge without prejudice the issue of the following U. S. Letters Patent bearing on this subject: No. 1,578,881, March 30, 1926, and No. 1,587,764, June 18, 1926, both issued to R. D. Duncan, jr. I also acknowledge as the source of a method of phase displacement employed herein as well as in the Duncan patent, the book "Wireless Telegraphy", by Dr. J. Zenneck, published by McGraw Hill Book Co., Inc., New York, 1915, last reprint March, 1918.

My invention is illustrated in the accompanying drawings, in which

Fig. 1 is a diagram showing the essential elements and circuits in a transmitter radiating three-phase carrier waves, with diverse modulation of the several phases.

Fig. 2 is a similar diagram of the essential elements and circuits at a receiving station for the same.

Fig. 3 is supplementary to Fig. 1, showing the method of applying the output circuits thereof to a three-phase wire transmission circuit, in place of the antenna shown in Fig. 1.

Fig. 4 is similar to Fig. 3, showing the method of connecting the receiving end of the said three-phase wire circuit to the input circuits of the receiving apparatus of Fig. 2.

Fig. 5 is a diagram of a modification of the system shown in Fig. 1, showing separate antennas, and different method of generation, and a delta form of inductive distribution of the phases to keep the modulating circuits entirely distinct from each other.

Fig. 6 is a diagram showing receiving apparatus and circuit for the transmitting station of Fig. 5.

Fig. 7 is similar to Fig. 3 showing transformer connection from the output circuits of Fig. 5 to a three-phase wire transmission circuit used instead of the antennas of Fig. 5.

Fig. 8 is similar to Fig. 4 showing the means for connecting the said three-phase transmission circuit with the input circuits of the receiver of Fig. 6 in place of the antenna connections shown in that figure.

Fig. 9 is a diagram with modified form of three-phase transmitter, whereby the several modulating circuits of the different phases are kept entirely separate and distinct from each other.

Fig. 11 is a diagram of an improved system in which not only are three phases of a high frequency carrier diversely modulated, but the three separate modulations or programs are alternated by rotation upon the three phases of the carrier waves or carrier currents, making it physically impossible for any unauthorized receiver to detect any of the programs.

Fig. 12 is a similar diagram showing an authorized receiver or analyzer adapted to the transmission scheme of Fig. 11.

Figure 10:
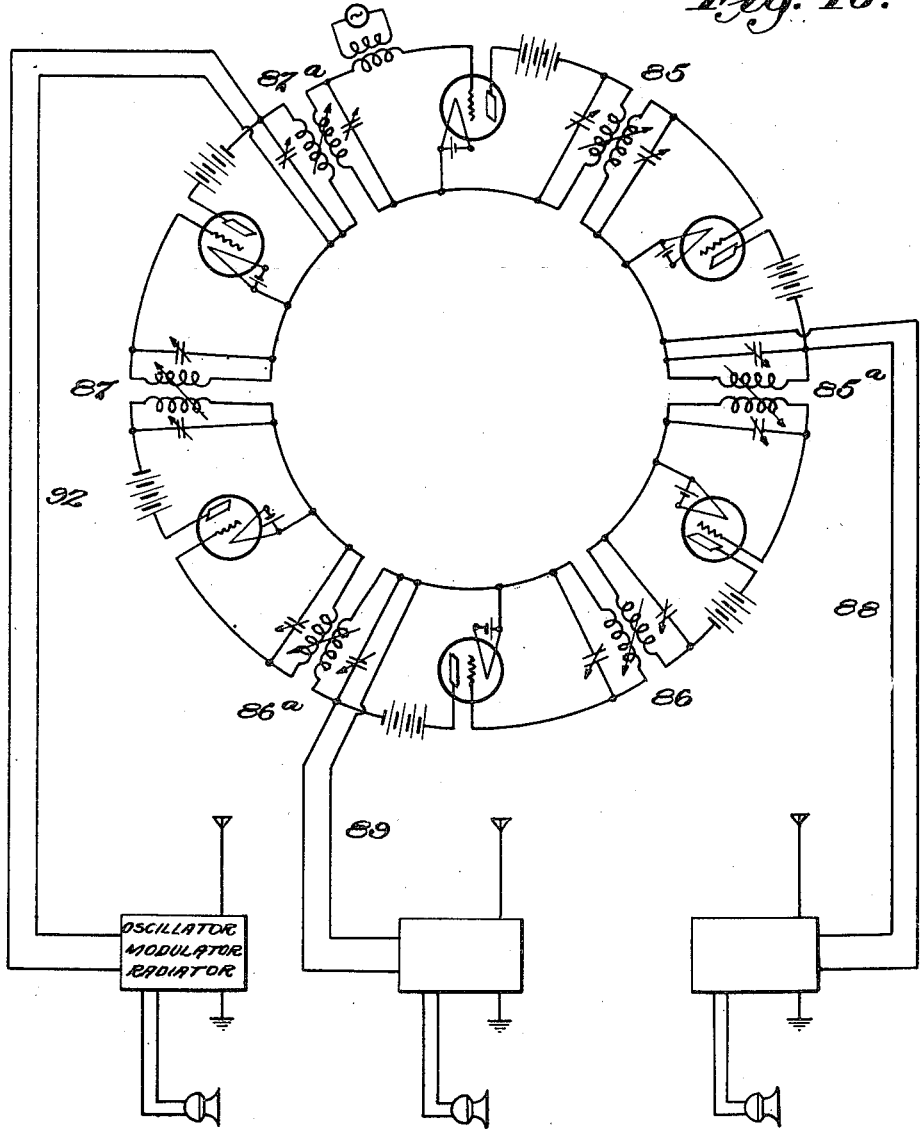
Fig. 10 illustrates a modification of the circuit of Fig. 9, in which the difference in phase angle is reduced by increasing the number of phases generated, and selecting symmetrical intermediate phases only for transmission.

Referring to Fig. 1, G designates a generator of polyphase high frequency currents comprising the following elements: 1 is an oscillator coupled at 2 to a circuit 3 containing ammeters 4 and 5, variometer 6, variocoupler 7, variometer 8, and field coils 9, which by reason of the arrangement shown pass currents 90° apart in phase, whereby a rotating field is produced and currents 120° apart are induced in the coils 10, 11, 12. A simplified diagram of this generator arrangement, with only one coil in the secondary, is shown in Fig. 10 herein, and the original thereof is on page 353 in the book by Dr. J. Zenneck entitled "Wireless Telegraphy." The coil 10 is connected through coupling 13 to the input circuit of tube 14, the coil 11 is connected through coupling 15 to the input circuit of tube 16 and the coil 12 is connected through coupling 17 to the input circuit of tube 18. These tubes are what I shall call phase oscillators, or amplifiers, whose outputs are modulated, amplified and passed to line or to radiator circuit, as the case may be. The tube 14 has its output or plate circuit coupled at 19 to the input circuit of tube 20 which in turn is shown connected through coupling 21 to the antenna circuit A. Similarly tube 16 is coupled at 22 to the input of tube 23 the output of which is coupled through 24 to the antenna circuit and the output or plate circuit of tube 18 is coupled through 25 to the input of tube 26 the output of which is coupled through 27 to the antenna circuit. In the upper part of this figure, tubes 28, 29 and 30 are modulator tubes. Tube 28 has its input coupled through transformer 31 to the primary modulator circuit 32, shown as a telephone transmitter. The input circuits of tubes 29 and 30 are connected through similar transformers to primary modulator circuits 33, 34 respectively. The plate circuits of the tubes 28, 29 and 30 are connected to the plate circuits of the tubes 14, 16, 18 respectively, with the usual bridged plate batteries B, B', B² and audio choke coils $c$, $c'$, $c^2$. Between the audio choke $c$ and the plate of tube 14 is a radio choke coil $c^3$, and similarly between the audio chokes $c'$—$c^2$ and the respective plates of tubes 16 and 18 are radio choke coils $c^4$—$c^5$, this entire arrangement enabling distinct and separate modulation of each phase of current produced by the three coils 10, 11 and 12. It is to be noted that while these coils are connected to a common point and the neutral wire therefrom grounded, they are separated from the respective phase oscillating tubes 14, 16 and 18 by the couplers 13, 15 and 17, so that the phase oscillating and modulating tubes, their amplifier-tubes and antenna couplers are all separate and distinct from each other.

The foregoing arrangement permits three phase carrier waves separately and diversely modulated to be radiated from the aerial A. It is assumed that a suitable frequency will be selected and produced by the oscillator 1 for this purpose. In case it is desired to transmit the three phase modulated carrier wave by wire instead of by radiation, the connections of Fig. 3 are employed in place of the antenna connections shown in Fig. 1. Thus, by substituting the dotted line $ff$ of Fig. 3 or superposing the same upon dotted line $ee$ of Fig. 1 the output circuit of tube 20 will be connected through coupler 21$^a$ and variometer 21$^b$ to line wire 35; the output of tube 23 will be connected through coupler 24$^a$—24$^b$ to line wire 36; and the output of tube 26 will be connected through coupler 27$^a$ and variometer 27$^b$ to line wire 37. Each of these lines contains a condenser or equivalent means to prevent leakage of power currents or the like into the radio circuits, and also to assist in tuning the lines. Suitable filters, which are well known in the art, may also be inserted when wire circuits are employed, to suppress the unmodulated component of the carrier wave leaving only the modulated side band or bands to be transmitted.

Fig. 2 is complementary to Fig. 1, and Fig. 4 shows the means for coupling the three phase wire transmission circuit of Fig. 3 to the receiving apparatus of Fig. 2 in place of the antenna. Referring to Fig. 2, A' is the antenna circuit connected by couplings 38, 39 and 40 to the three composition circuits 41, 42, 43, which are coupled respectively through coils 44, 45, 46 to the three windings 10', 11', 12' respectively of the generator G' which is energized through circuit 2', 4', 6', 9', 5', 7', 8' by the oscillator O', the operation being the same as in the correspondingly numbered parts in Fig. 1 at the transmitting station. The composition circuits 41, 42, 43 are also separately and invidually coupled through coils 47, 48, 49 to the input circuits of the detector tubes 50, 51, 52, the output circuits of which are connected to jacks J, J', J$^2$ with which cooperates a terminal plug connected to the receiving set which may contain amplifier tubes and loud speaker or may be simply a headphone. As will appear later, each of these jacks carries a different program, and by plugging into the proper jack selection of program can be effected; also if desired more than one program can be taken at the same time, by providing additional receivers.

The oscillator O' is maintained by any suitable means in synchronism with the oscillator O. Where a wired system of distribution is employed, as for example using the devices of Figs. 3 and 4 synchronizing current can be transmitted over the wire, either as a master wave or as a base frequency wave from which harmonics can be derived at the two ends, or otherwise. Such synchronizing means are known in the art and need not be specifically described, as they form no part in themselves of the present invention. In my prior application, Serial No. 71,455, filed November 25, 1925, I have disclosed means for transmitting unmodulated current of carrier frequency from point to point for the purpose of homodyne receiving of side bands, and I also acknowledge as part of the prior art the following: Paper by Messrs. Colpitts and Blackwell entitled "Carrier current telephony and telegraphy" published in the "Transactions of the American Institute of Electrical Engineers", Vol. 40, page 205, 1921; British Patent 174,312, accepted January 9, 1922, and U. S. patent to Affel et al., No. 1,617,935, patented February 15, 1927, and filed January 7, 1925.

Fig. 4 shows the same three wires 35, 36, 37 shown in Fig. 3, connected through coils 38$^a$, 39$^a$, 40$^a$ which may be substituted for the coils 38, 39, 40 in Fig. 1, so as to bring the three detectors into inductive connection with the circuits 41, 42, 43. Variometers 38$^b$, 39$^b$, 40$^b$ are also shown, and it is intended that the dotted line $gg$ should be superposed upon the dotted line $hh$ in making the substitution of wired transmission for radiation.

The operation of the system as described is as follows: The oscillator O supplies energy to the coils 9, which produce a rotating field, and in a known manner induces in the coils 10, 11, 12 currents of the same frequency but 120° apart in phase. These currents are then again induced into the input circuits of the tubes 14, 16, 18, which oscillate at the same frequency but each in its own phase. They are conveniently called therefore "phase oscillators". The primary modulators or microphones in circuits 32, 33, 34 act through the modulator tubes 28, 29, 30 upon the plate circuits of tubes 14, 16, 18 in a well understood manner to produce modulated currents in the input circuits of amplifier tubes 20, 23, 26, which are to be taken as typical only, since they may be increased in number or power if desired. If the modulated carrier waves thus produced and amplified are to be radiated, the couplings 21, 24, 27 are employed with the antenna circuit A or the equivalent thereof. It may be found in practice that separate antennæ are preferable as shown in Fig. 5, and such separate antennæ may be placed at a distance from each other if desired. All such non-essential changes or modifications are contemplated. If wire transmission is to be employed, the output circuits of the tubes 20—23—26 deliver the several modulated currents to the three phase circuits 35, 36, 37 from which they are taken through the couplers 38ª, 39ª, 40ª and delivered to the composition circuits 41, 42, 43, (Fig. 2). On the other hand, if radiation is depended upon for the transmission of modulated waves, the waves radiated at A in Fig. 1 are collected by the antenna A' in Fig. 2, and so communicated to the composition circuits 41, 42, 43. From this point on the operation is the same in practice, with either method of transmission. The oscillator O' and the circuits 2', 6', 9' produce a rotating field around the coils 9' which induces in the coils 10', 11', 12' currents of the same frequency as that produced by the oscillators O—O' but with phases 120° apart. From these three phase coils corresponding currents are induced in the composition circuits 41, 42, 43, the purpose being to resupply each circuit with unmodulated carrier current of the proper phase. It is assumed that all unmodulated carrier current transmitted from the station of Fig. 1 will be cancelled out before it reaches the receiving station of Fig. 2, and preferably before it leaves the antenna A or the coils 21ª, 24ª, 27ª. The currents transmitted are of the nature of "side bands", that is to say, bands of frequencies composed of the carrier current frequency plus or minus the modulated frequencies. For each phase, since each is separately modulated, there will be two side bands formed and if it be desired to transmit only one, suitable filters must be employed, which are well known and available in the art. In case it be found that there are objectionable harmonics or other interfering phenomena of a similar nature, filters therefor may also be employed, as proposed in the patents to Duncan hereinbefore referred to. For an unauthorized person, with an ordinary receiver, it would be impossible to obtain any intelligible sounds from the waves thus transmitted either over the wires or through the ether. Moreover, since the modulations in the transmitted waves are superimposed as an envelope upon the carrier waves, or in other words that the modulation is due to variations in amplitude of carrier wave energy, it will be understood that in any ordinary single phase instrument, since the frequency is identical the carrier wave energy represented in the modulations will tend to cancel out, and as there are three different sets of modulations, the result will be a very faint murmur, or nothing at all.

With the instruments of Fig. 2 on the other hand, the effect of the unmodulated synchronous carrier current supply to the three circuits 41, 42, 43. is to pick up the three phases, reenforce them and pass them on to the corresponding detectors 50, 51, 52.

Referring to Figs. 5, 6, 7 and 8, a modified system is shown which will now be described: In Fig. 5, instead of the Zenneck type of polyphase generator, I have shown three separate generating elements $G^2$, $G^3$, $G^4$ on a common shaft $g$—$g'$, properly adjusted so that they will generate currents 120° apart in phase, but of the same frequency. These are respectively connected to coils 53, 54, 55 of a delta winding of a three phase transformer, having separate secondary windings 56, 57, 58 connected to the input circuits of oscillator tubes 59, 60, 61 respectively whose outputs are connected through couplers to the antenna circuits 62, 63, 64. The input or grid circuit of each tube is coupled to a primary modulator circuit 65, 66 or 67, each modulator circuit containing a microphone or its equivalent. Fig. 7 is similar to Fig. 3 showing transformer coils for connecting the circuit of tubes 69, 70, 71 to wires 35, 36, 37 in place of the antenna circuits 62, 63, 64.

Fig. 6 is the receiving circuit for Fig. 5 and is designed to give individual selection of program by selection of phases. A set of generators $G^{20}$, $G^{30}$, $G^{40}$, corresponding exactly to the generators $G^2$, $G^3$, $G^4$ are driven by a common shaft $g^{10}$ and supply carrier currents 120° apart in phase to the three circuits 65, 66, 67, which correspond to the circuits 41, 42, 43 of Fig. 1 and which are also coupled to the receiving antenna circuit $A^2$, or to the wires 35, 36, 37 in Fig. 8, as the case may be. The composition circuits 65, 66, 67 contain detector tubes 68, 69, 70 whose plate circuits are connected to pairs of switch terminals 71, 72, 73, with which cooperate a pair of switch arms 74 connected through wires 75 to the audio amplifier 76 and loud speaker 77. The operation is the same as in Fig. 2, the movable switch arms 74 affording selection of program.

Referring to Fig. 9, the general arrangement corresponds to that of Fig. 1, the principal test being in the type of generator employed, and the means for obtaining phase displacement. In this case the generator $G^5$ is shown as consisting of three tubes 82, 83, 84, connected in tandem and symmetrically to form an endless chain. The plate circuit of tube 82 is connected through coupling 85 to the grid circuit of the tube 83, the plate circuit of the latter is connected through coupling 86 to the grid circuit of tube 84 and the plate circuit of the latter is connected through coupling 87 to the grid circuit of the first tube 82. Thus any oscillation set up in any one of the tubes will be repeated round and round as long as the circuits are closed. Input and output circuits of each tube are turned so as to maintain a constant frequency, and the couplers 85, 86, 87 are variable for purposes of varying the phase displacement as between the tubes. Several arrangements are possible in order to get phases 120° apart. For example, by having the couplings so wound as to completely reverse the phase, at 180° angle, then adjusting the degree of coupling so as to shift the phase angle back through 60°, the desired displacement of 120° may be obtained. Various other expedients will occur to those skilled in the art. In order to maintain the standard frequency, and prevent "creeping" of phase, I provide a standard oscillator $O^3$ at some point in the ring. The output circuits of the respective tubes are tapped by feed circuits 88, 89 and 92 which supply the phase oscillators 93, 94, 95 respectively. Current from each of these oscillators is modulated as before described in connection with Fig. 1, and the modulated waves are then radiated from circuits $A^5$, $A^6$, $A^7$, or transmitted over three phase wire circuit as hereinbefore described.

Fig. 10 shows a modification of this arrangement in which more than three tubes are employed in the generator, the actual number being six, although nine or any multiple of three may be used if desired. In this case the arrangement and operation are precisely the same as in Fig. 9, with the exception that the feed circuits 88, 89, 92 are taken off from the plate circuits of alternate tubes. The advantage gained is that direct and simple adjustment of the couplers 85, $85^a$, 86, $86^a$, 87, $87^a$ is all that is necessary to give the phase displacement. Since there are six tubes, a difference of only 60° is required between the first and second, the second and third, and so on. The three phase current is taken off however as before at points 120° apart. If nine tubes should be employed, the angular displacement between adjacent tubes would be only 40°, and with twelve tubes, only 30°. In this connection it may be well to state that the invention is not limited to three phases, but may use more than three if desired.

Referring to Figs. 11 and 12, these represent respectively the transmitting station and the receiving station of a polyphase system, in which different programs are imposed on the different phases of a polyphase carrier, and are then rotated, so as to be shifted each from one phase to the next, continuously. In Fig. 11, 113 represents the aggregation of oscillator, modulator and radiator apparatus described in detail in the previous figures, and 114 is the primary modulator circuit upon which the original audio modulations are imposed, and by which they are conveyed to the modulating tube. Instead of this circuit passing directly to the microphone T' however, it terminates at the secondary of an induction coil $t'$. 115—116 are similar oscillator, modulator radiator sets, with circuits 117—118 terminating in the secondaries of induction coils $t^{10}$—$t^{100}$, respectively. Generators $G^7$ supply a three phase current to the phase oscillators. The three programs are supposed to be supplied from microphones or the equivalent at T', $T^2$, $T^3$, whose circuits 119, 120, 121 terminate in the primary coils $t^2$, $t^{20}$, $t^{200}$, respectively. These coils $t^2$, $t^{20}$, $t^{200}$ are mounted on a turn table 122, which is driven as indicated by the arrow, at a constant speed sufficiently high so that each of the primary coils will come into successive relation with each of the secondary coils, at intervals so short as to be imperceptible to the ear. The effect of this then is to transfer a modulation as for example to that due to microphone T' to circuits 114, 117, 118 in rapid rotation, the modulations due to the other two microphones being similarly transferred in triple alteration. At any given instant therefore there will be a different program on each of the three phases, and the order will be constantly changing, but without being audible as to the change itself. Connection with any one wire therefor or the receiving of any one carrier current phase by itself, would result in rendering audible all three modulations in a jumble. It should be observed however that there would be only one-third of the energy in each program because they are divided up amongst three phases, so that the general effect in an unauthorized receiver would be weak as well as jumbled. In Fig. 12, 123 represents a turn table in every respect similar to and operating the same as turn table 122 in Fig. 11. On this turn table are carried three coils 124, 125, 126 corresponding to the primaries of Fig. 11, but connected through receiving circuits 127, 128, 129 to switching terminals by which they can be connected to a suitable detector set and receiver. In this case the primary coils 130, 131, 132 are connected through circuits 133, 134, 135 to the plate circuits of tubes 136, 137, 138, whose input or grid circuits are coupled through coils 139, 140, 141 to composition circuits 142, 143, 144 which are also coupled through coils 145, 146, 147 to the common antenna $A^{20}$. Three homodyne generators $G^{20}$ are connected respectively to the composition circuits 142, 143, 144 through couplers 148, 149, 150, the generators $G^{20}$ being of the same frequency and driven by a common shaft to afford positive and fixed phase relation between them. The generators $G^{20}$ constitute a homodyne three phase source of oscillations for the three phase carrier current of Fig. 11. In the operation of Fig. 12, the modulations picked up from the coils $t^1$, etc. of Fig. 11 are received at the primary or secondary coils 130, etc. of the receiving station. As the secondaries 124, etc. rotate in synchronism with the correspondingly positioned primaries $t^2$ etc. of a transmitter (Fig. 11), the triplicate signals are segregated or analyzed and distributed one to each of the output circuits 127, etc. corresponding to the input circuits 119, etc. respectively, of the transmitter.

I do not claim herein the polyphase generator illustrated in Figs. 9 and 10; nor the circuits illustrated in Fig. 6 comprising composition circuits with detectors, audio receiving means and switching means for connecting the same selectively to any of said detectors; nor the generator of high frequency alternating current illustrated in Fig. 4 as applied to a receiving circuit for purposes of selection; all of these features being illustrated, described and claimed in a separate application filed as a division hereof.

It is to be understood that while I have described certain specific forms of apparatus and circuits on which my invention may be practiced, I am not limited thereto. I contemplate all such non-essential changes and modifications as fall fairly within the scope of the appended claims. Thus for example in the receiver illustrated in Fig. 6, or in fact any of the receivers, means for adjusting the phase angle of the generators, and switches for controlling the output circuits of the generators and directing current to one composition circuit or another, are to be understood. Such phase angle adjustors are known in the art and need not be specifically described. They usually consist of means for advancing or retarding the generating element with respect to the motor by which it is driven. Also, instead of different modulations of the several phases of transmitted carrier current the same modulations may be placed on all of the phases which by recomposition can then be received at the receiving station as before.

What I claim is:

1. In a system of the class described, a polyphase high frequency generator comprising an oscillator, means for producing a rotating field at the frequency of said oscillator, inductive means for producing a polyphase carrier from said rotating field, a thermionic tube for each phase of the carrier having its input circuit connected to receive the same, the input and output circuits of said tubes being maintained separate and distinct from each other, an output circuit for each tube connected to its plate and filament, and a modulating tube for each plate or output circuit acting directly on the current, the circuits of said modulating tubes being separate and distinct from each other and each having its own separate audio modulator, together with means for transmitting said modulated polyphase carrier to a receiving station, and means at said receiving station adapted to separately receive each phase and to detect the modulations imposed thereon.

2. In a system of the class described, means for generating a polyphase high frequency carrier, phase oscillating tubes, one for each phase of the carrier, means for separately modulating the several phases of the carrier, comprising thermionic tubes each having a primary modulator connected to its input circuit and having its output or plate circuit connected to the plate circuit of its corresponding phase oscillating tube, said modulator tubes having separate sources of current supply for their plate circuits each with its own separate audio choke coil, and each connection to the plate of the corresponding phase oscillating tube containing a separate individual radio choke, together with means for transmitting said modulated polyphase carrier to a receiving station, and means at said receiving station adapted to separately receive each phase and to detect the modulations imposed thereon.

3. In a system of the class described, means for generating a polyphase high frequency carrier, means for separately modulating each phase of said carrier, means for transmitting said modulated polyphase carrier to a receiving station and means to receive the separately modulated phases comprising separate receiving or composition circuits equal in number to the number of phases, means for receiving the transmitted waves and applying them to said circuits, means to supply polyphase carrier current unmodulated to said composition circuits, one phase to each circuit, synchronous with and corresponding to one of the phases generated at the transmitting station, and separate detector means connected to said composition circuits respectively.

4. In a system of the class described, means for generating a polyphase high frequency carrier, means for separately modulating each phase of said carrier, means for transmitting said modulated polyphase carrier to a receiving station and selective receiving means comprising a plurality of elements for generating high frequency currents in synchronism with and corresponding in phase to the polyphase carrier generated at the sending station, an input receiving circuit and detector means with audio responsive apparatus connected to the output circuit thereof, and means to apply current from said generating elements individually and selectively to said input circuit.

5. In a system of the class described, means for generating a polyphase high frequency carrier, means for separately modulating each phase of said carrier, means for transmitting said modulated polyphase carrier to a receiving station and selective receiving means comprising a polyphase generator and switching means to supply current therefrom of any desired phase or phases to a receiving circuit adapted also to receive the modulated carrier frequencies from the transmitting station.

6. In a system of the class described, means for generating a polyphase high frequency carrier, means for separately modulating each phase of said carrier, means for transmitting said modulated polyphase carrier to a receiving station and a selective receiver comprising a primary receiving circuit, a secondary or composition circuit, connected to the input circuit of a detector having its output circuit connected to audio apparatus, and a generator furnishing current of the same frequency as that transmitted from the sending station, with means to adjust the phase angle of said current for selective purposes.

7. In a system of the class described, having a transmitting station including means for generating a polyphase high frequency carrier, and a receiving station adapted to separately receive each phase of said carrier, means at the transmitting station for modulating the same signals upon the several phases of the carrier, and means at the receiving station adapted to supply carrier current energy at the same frequency as and in phase with the original carrier generated at the sending station, with means to detect and combine the modulations on the several phases of the original carrier thus reenforced.

8. In a system of the class described, having a transmitting station including means for generating a polyphase high frequency carrier, and a receiving station adapted to separately receive each phase of said carrier, means at the transmitting station for modulating different signals upon the several phases of the carrier, and means for rotating said modulation so that each signal will be modulated successively upon different phases in rotation and means at the receiving station adapted to analyze the received modulated phases and recompose the several signals by synchronous rotation.

9. In a system of the class described, having a transmitting station including means for generating a polyphase high frequency carrier, and a receiving station adapted to separately receive each phase of said carrier, means at the transmitting station for modulating different signals upon the several phases of the carrier in rotation, means at the receiving station for analyzing said modulated phases by synchronous rotation, and for recombining each set of signal modulations to make them separately audible, said rotation of modulation and demodulation as respects any one signal being at a rate outside the limit of audition.

10. The method of silent wave transmission of broadcast signals which consists in generating a polyphase high frequency carrier, modulating each phase of said carrier, transmitting said modulated polyphase carrier to a receiving station, and at said receiving station generating a synchronous polyphase current of the same frequency as the initial carrier, and combining the same in phase with the modulated waves received, then detecting the reenforced modulated waves in the usual manner.

11. The method of multiple broadcasting which comprises generating a polyphase carrier, separately modulating the several phases of said carrier with different signals, transmitting the modulated carrier thus produced, receiving the several modulated bands transmitted and selectively combining therewith in the receiving circuits current of the same frequency as the original carrier, and of such phase or phases as to strengthen only the phase or phases bearing the desired signals, and to receive the same.

In testimony whereof I hereunto affix my signature.

EDWARD E. CLEMENT.